United States Patent [19]

Teeslink

[11] Patent Number: 4,756,630
[45] Date of Patent: Jul. 12, 1988

[54] TOOLHOLDER GUIDE

[76] Inventor: John W. Teeslink, 1162 Newport La., Kaysville, Utah 84037

[21] Appl. No.: 376,250

[22] Filed: May 7, 1982

[51] Int. Cl.⁴ .................. F16C 29/02; F16C 27/02; F16C 33/06; B26D 5/00
[52] U.S. Cl. ............................ 384/30; 384/29; 384/37; 384/42; 83/635
[58] Field of Search .................. 83/552, 635; 308/4 R, 308/3 A, 4 C, 3 R; 384/282–285, 295, 438, 29, 30, 37, 42

[56] References Cited

U.S. PATENT DOCUMENTS

| | | | |
|---|---|---|---|
| 221,473 | 11/1879 | Raup | 308/4 R |
| 1,217,546 | 2/1917 | Yount | 308/4 R X |
| 3,853,029 | 12/1974 | Todd | 83/552 |
| 4,036,540 | 7/1977 | Seufert | 384/282 |
| 4,240,314 | 12/1980 | Teeslink | 308/4 R X |

Primary Examiner—Stuart S. Levy
Assistant Examiner—Thomas R. Hannon
Attorney, Agent, or Firm—A. Ray Osburn

[57] ABSTRACT

A toolholder guide for punch blocks and turrets and the like comprising a toolholder bore carrying about its circumference longitudinal protruding wear strips preventing contact between the toolholder body and the wall of the bore. The wear strips are preferably of plastic and are secured into dovetailed longitudinal keyways broached into the wall of the bore. The innermost surfaces are broached to the a close clearing radius with the body of the toolholder so that the toolholder is accurately centered and guided for reciprocal motion within the bore. Preferably, the broaching operations are carried out using a broaching fixture which secures an actuating hydraulic cylinder directly to the punch block or turret using adjacent toolholder bores for attachment purposes.

10 Claims, 4 Drawing Sheets

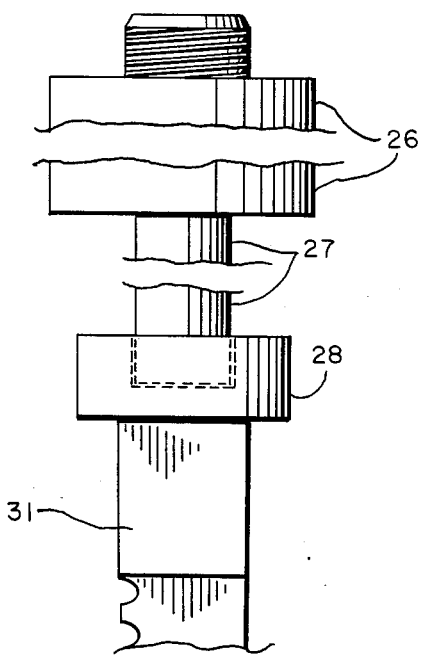
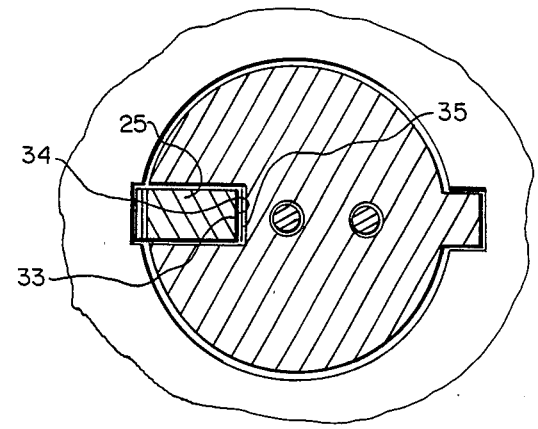
FIG. 6
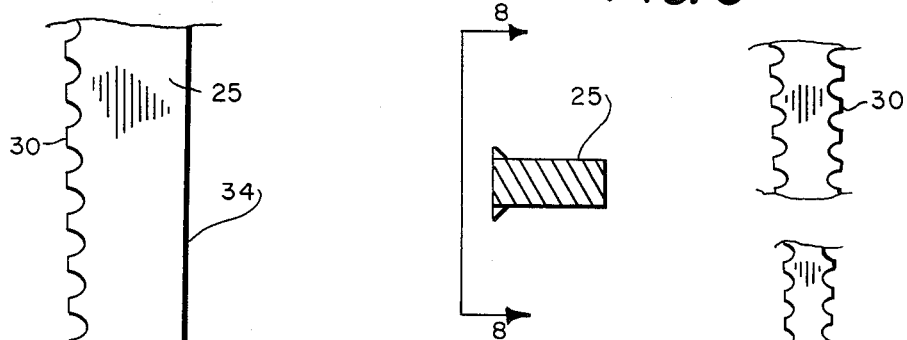
FIG. 7
FIG. 8
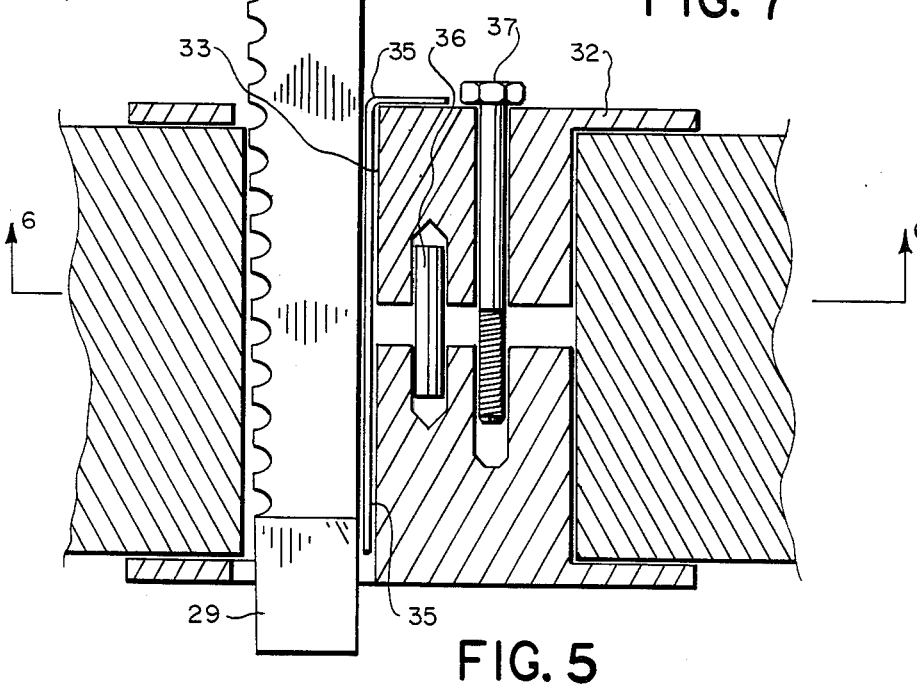
FIG. 5

TOOLHOLDER GUIDE

BACKGROUND OF THE INVENTION

1. Field

The invention relates to toolholders and more particularly those used for punching tools, and means for extending their useable life, with application to turret punches and punch blocks.

2. State of the Art

Repeated use of punch tools results in wear of the bores for guiding and positioning the toolholders, punching operations eventually becoming impractical because the toolholder is no longer sufficiently guided and centered with respect to the work piece. The wear on the bore is typically not uniform, so that replacement of the toolholder with one of larger diameter is not practical. Restoring the guiding bore to useable condition usually requires it be re-bored, which requires replacement of the toolholder with one of appropriately larger diameter. Thus, both the bore and the punch holder must be refurbished. The resulting toolholder is of non-standard size, leading to confusion in use. Re-boring of the toolholder bore generally requires complete dismantling of the turret punch press to send the turret to another facility for boring. It is very desirable that some method be available to refurbish the worn bore that permits the use of the original toolholder and avoids the lost time and cost of dismantling and re-boring. Equally desirable is a toolholder guide capable of long life while being easily repaired. One method for refurbishment is disclosed in U.S. Pat. No. 4,240,314. This method involves the drilling of spaced side bores into the toolholder wall and the insertion of plugs of resilient material into the bores to position the toolholder away from the wall. The plugs extend outwardly into the toolholder bore sufficiently so that the toolholder compresses the resilient plugs tightly into the side bores. The toolholder reciprocates across the ends of the plugs. The small plugs provide limited bearing surface and wear soon occurs requiring the replacement of the plugs, although their resilient springback extends the useful life somewhat. The plastic tends to creep under constantly applied load so that the advantage of the compression is largely lost. This method is therefore of severely limited value, either for repair or for original equipment.

BRIEF SUMMARY OF THE INVENTION

With the foregoing in mind, the disadvantages of prior art means for extending the life of toolholder bores are eliminated or substantially alleviated by providing a toolholder guide comprising a toolholder plate having a toolholder bore with longitudinal wear strips along which the toolholder reciprocates without contact with the wall of the bore. The wear strips are retained within keyways spaced about the wall of the bore, and protrude radially inward from the wall of the bore to guide the toolholder. The bearing surfaces of the strips are preferably formed into longitudinal cylindrical segments closely centered upon the axis of the bore, providing close but clearing tolerances with the body of the toolholder. Preferably, the strips are of wear resistant plastic, although metal can be used. The bearing strips may be provided to refurbish worn toolholder bores, or can be incorporated when the turret or punch block is manufactured. Because the longitudinal strips provide very large bearing surfaces, the useful life of the toolholder guide is very substantially extended. When the strips eventually become excessively worn, they may be easily removed and replaced, further extending the useful life. The strips, by precluding contact between the metal toolholder outside diameter and the walls of the bore, also prevent wear of the toolholder. Preferably, the strips and keyways are matchingly dovetailed. The keyways are best provided by broaching of the cylinder walls using special tools. The broaching tools may be powered by a hydraulic ram. The keyways are advantageously made in two broaching steps. First, a preliminary rectangular keyway is broached into the cylinder wall. The keyway is then dovetailed using a dovetail shaped broach. Rectangular blanks of the plastic bearing material are then forceably intruded lengthwise into the dovetail, the edges thereof cutting away excess material so that the strip is dovetailed to fit the keyway. The radially protruding strip is then formed to final configuration, preferably by longitudinal broaching. The toolholder body fits closely within the radiused surfaces of the bearing strips without compression of the strips, small but sufficient clearance being provided. Preferably, the broaching is done using a fixture adapted to mount the hydraulic cylinder and ram directly from the turret or punch block, using nearby bores for attachment purposes, no dismantling of the turrets being required.

It is therefore a principal object of the invention to provide toolholder guides in punch blocks or turrets wherein wear between the toolholders and the walls of toolholder bores is substantially eliminated. It is a further object to provide means for repairing worn toolholder bores in punch blocks or turrets. A still further object is to provide wear resisting means that are replaceable after wear becomes excessive and to do so economically, especially without any dismantling of turret presses. Further objectives and advantages of the invention will be apparent from the following detailed description taken in conjunction with the accompanying drawings.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
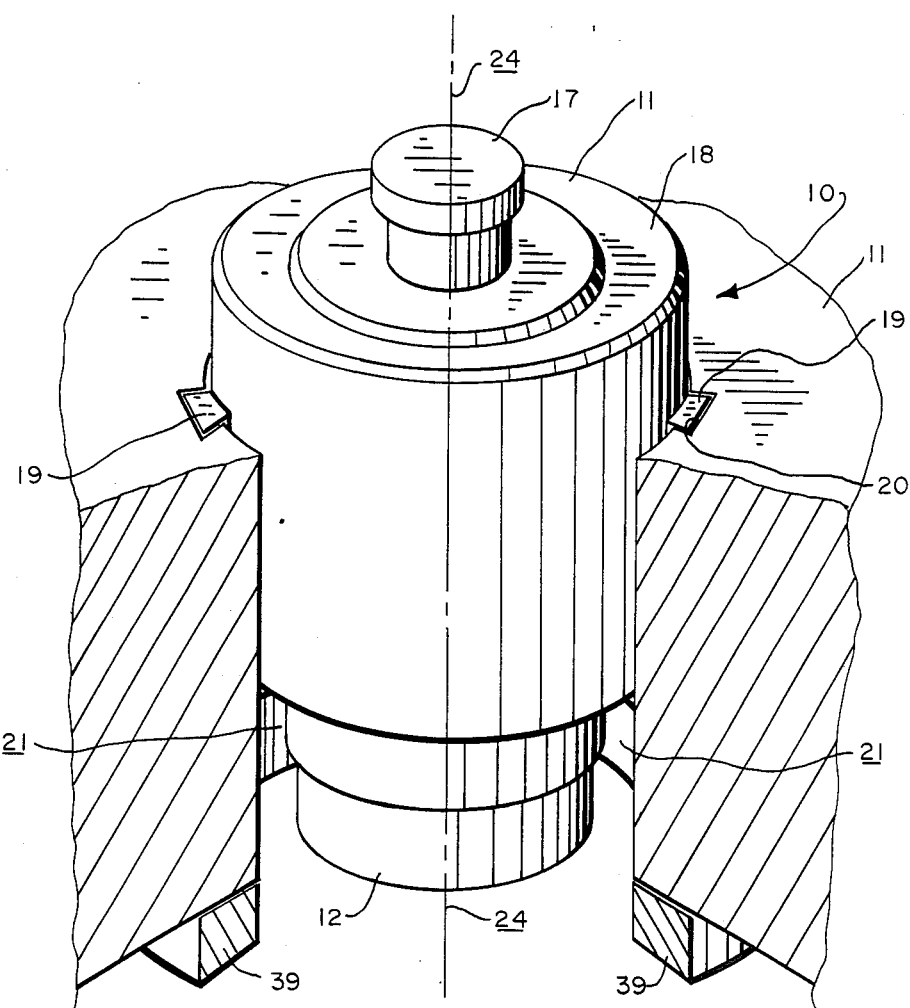
FIG. 1 is a perspective view of the toolholder guide having a toolholder body therein, partially cut away, drawn to substantially full scale, FIG. 2 a plan view of the toolholder guide with contained toolholder of FIG. 1, drawn to the same scale, FIG. 3 a vertical cross sectional view of the toolholder guide and toolholder of FIG. 1, drawn to the same scale, FIG. 4 a perspective representation of a strip blank used in construction of the toolholder guide of FIG. 1, drawn to substantially full scale, FIG. 5 a fragmented representation of a toolholder guide in the process of manufacture, the toolholder guide being shown in cross section, a broach, hydraulic cylinder and hydraulic piston also being shown, all drawn to substantially full scale, FIG. 6 a horizontal cross sectional view taken along line 6—6 of FIG. 5, drawn to the same scale, FIG. 7 a cross sectional view of a dovetailing broach used in construction of the keyways of the toolholder guide, drawn to substantial full scale, FIG. 8 a view of fragments of the broach of FIG. 7 taken along line 8—8 thereof, drawn to the same scale, and FIG. 9 a perspective representation of the toolholder guide of FIG. 1 in the process of manufacture, showing a broaching fixture used in said manufacture.
Figure 2:
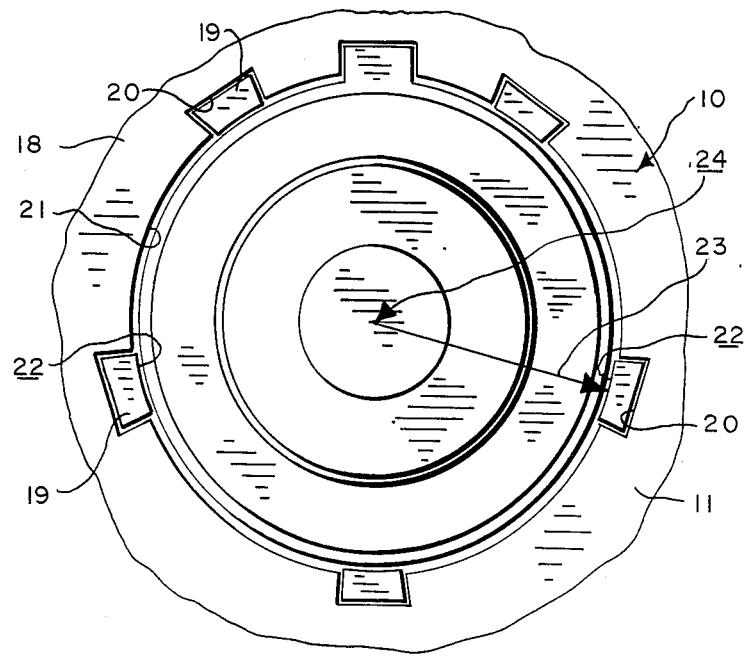
Figure 3:
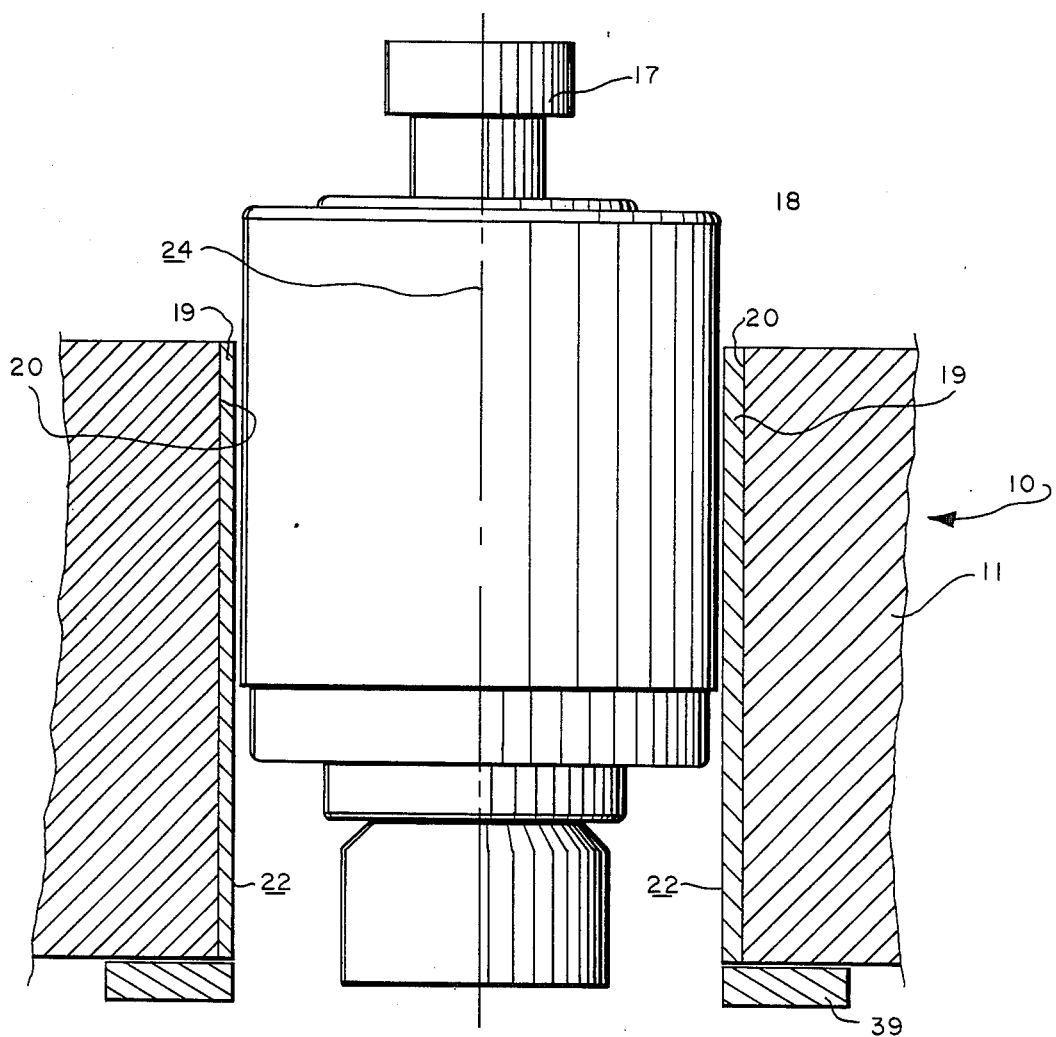
Figure 4:
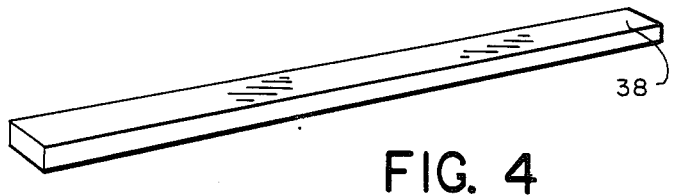

The toolholder guide 10 is now described with reference to the drawings, which utilize a turret as an illustrative example. In FIGS. 1-3, a toolholder 11 with an affixed punching tool 12 is illustrated installed for reciprocating motion within a toolholder guide bore 13. Toolholder 11 is forced downwardly so that punch tool 12 strikes a work piece 14 shown in dashed lines resting upon a die plate 15 having an appropriately sized die bore 16. Actuating force is applied to an uppermost knob 17 by means of a cam, a hydraulic piston or the like, as is common in turret and punch block work. Toolholder body 18 is guided and centered by elongate strips 19 installed within dovetailed keyways 20 the full length of toolholder bore 13. The strips 19 inwardly protrude from the cylindrical wall 21 of bore 13, so that frictional contact between toolholder body 18 and the wall 21 of bore 13 is prevented. The inwardly facing surfaces 22 of strips 19 are formed to a radius 23 centered upon the axis 24 of bore 13. The radius 23 is slightly larger than that of toolholder body 18, so that it may be reciprocated freely within bore 13. Radial clearances provided between surfaces 22 and toolholder body 18 are about 0.0025 to about 0.0005 inches. The clearance between body 18 and the wall 21 of a refurbished bore 13 may vary a fraction of a thousandth to several thousandths of an inch depending on the localized wear of bore 13 before installation of strips 19. Original equipment with toolholder guide 10, may be made more economically, since bore 13 need not be built to the very close tolerances required with present equipment.

The wear and centering strips 19 may be constructed of metals, such as steel, copper, or aluminum. However, plastic materials are preferred because of their greater machinability and abrasion resistance, and their comparative softness, the latter property assuring that the steel toolholder body is not worn or scored. The harder plastics are preferred, tending to have longer useful life. These include the polyamides Lexon, Delrin and Zytel (nylons). Three strips 19, equiangularly placed around the wall 21 of bore 13, produce satisfactory results. Local strip wear is minimal because frictional loads are distributed over very substantial bearing areas. Greater numbers of strips 19 increase the time that toolholder guide 10 may be used before strip replacement is required, because of the further increased bearing area. A circumferential spacing of 1½" to 2" has proven satisfactory for strips 19. Useful strip lives ranging from twelve to 48 months are easily attainable. With replacement of strips 19 when needed, toolholder guide 10 will last indefinitely.

Figure 9:
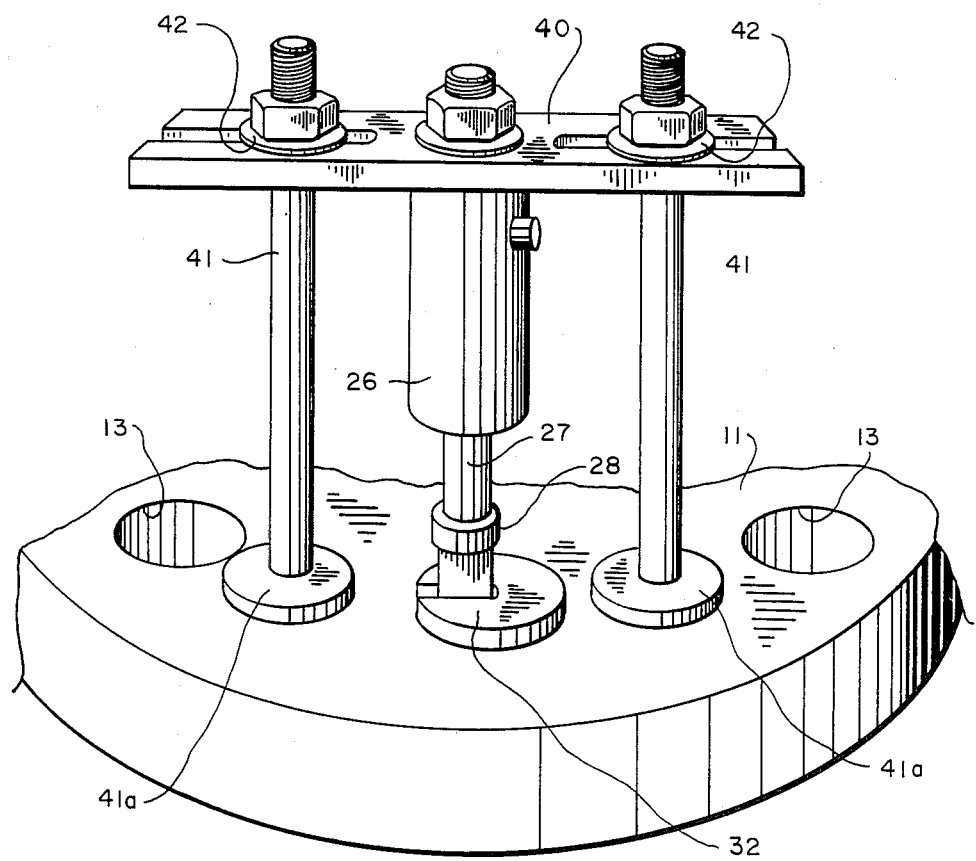

The method of manufacture of toolholder guide 10 is now described with reference to FIGS. 4-9, turret toolholder 11 again being shown for illustrative purposes. The keyways 20 are broached into the walls 21 of bore 13. FIG. 9 shows a typical broaching setup, including broaching tool 25, hydraulic cylinder 26, and hydraulic piston 27 with broach contacting shoe 28. Broach 25 has a lower end lead portion 29, a toothed portion 30 and an upper end lead portion 31. A split insert 32 with a broach guide slot 33 is used within bore 31, to guide untoothed side 34 of broach 25. Toothed side 30, slightly tapered downwardly and inwardly, is forced against wall 21 of bore 13 as broach 25 is urged downwardly by piston 27. The removal of about 1/64" of metal from the bore walls for each downward stroke has proven satisfactory. Shims 35 are provided as required to accurately position broach 25, so that repeated cutting strokes may be made. Although insert 32 may be of one piece, it is advantageous that it have upper and lower portions, to be adaptable for varying tool guide lengths. Dowel pins 36 and tie bolts 37 secure the two pieces into bore 13. Each keyway 20 is best broached in two separate steps. The first utilizes a rectangular broach 25, to cut a rectangular keyway to the desired depth. Next, a longitudinally tapered, side toothed dovetail broach 25 is used to cut the sides of keyway 20. Keyway 20 may, for example, be about ⅜" wide at the bottom and 3/32" deep from the wall of bore 13. See FIGS. 5 through 8 for examples of broach configurations.

Plastic blanks 38 for strips 19 may be rectangular, 7/16" by ⅛" for example. (FIG. 4) Blanks 38 are pressed longitudinally into the dovetailed keyways 20. Excess material is sheared off by the edges of keyway 20, which is completely filled by strips 19. The considerable axial force needed to insert and shear the blanks 30 may be provided with the hydraulic piston 27. It is therefore advantageous that blanks 38 be encased within, and pressed from, a rectangular metal shell (not shown) to prevent buckling. Finally, the inwardly protruding portions of strips 19 are in turn longitudinally broached, using an appropriate broach 25, to provide the close tolerance, radiused innermost surfaces 22. This final strip broaching step completes toolholder guide 10. A stripper plate 39 is typically provided at the bottom edge of bore 13 to retain strips 19 during use of toolholder guide 10. The final shaping of surfaces 22 by machining or grinding is possible, but is not preferred, presenting a more severe centering problem than does the broaching method, and requiring additional expensive equipment.

The dovetailed keyways 20 are greatly preferred, for retention of strips 19. Rectangular keyways, for example, could be employed (not illustrated) but require retaining screws in countersunk bores through the strips 19 and matching bores into the wall of bore 13. This reduces the bearing surface of the strip, and the countersunk bores deform in use, loosening the strips and increasing the wear to seriously shorten the useful life of toolholder guide 10. Rectangular keyways, if used, could be machined by other methods than the preferred broaching, such as by use of a disc like rotating cutting tool.

It is advantageous to utilize a broaching setup as illustrated in FIG. 9. Hydraulic cylinder 26 is secured to a slotted cross bar 40, in turn supported upon two threaded posts 41. Each post 41 is secured within a nearby bore 13, or which purpose internally threaded attaching flanges 41a are provided. Slots 42 permit precise positioning of cylinder 26 and piston 27 above the broaching location. Bar 40 and posts 41 may be moved when required to successive bores 10. With this setup, it is not necessary to provide any other clamps, supports or the like, and it can be used from bore to bore and from machine to machine, without removing the turrets from the machines.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The toolholder guide for punch presses and the like including a turret punch press, said guide comprising:
    a toolholder plate having;
    at least one machined bore therethrough adapted to receive the body of a toolholder for reciprocal motion therein;
    at least three angularly spaced, elongate keyways within the wall of the bore;
    a wear and centering strip installed within each keyway the full length thereof, said strip protruding radially to the bore inwardly beyond the wall thereof, the strips being adapted to receive the toolholder body between their inwardly facing surfaces in close clearing tolerances therewith.
2. The toolholder guide of claim 1, wherein, the inwardly facing surfaces of the strips are each a longitudinal cylindrical segment centered to close tolerances upon the longitudinal center line of the toolholder bore.
3. The toolholder guide of claim 2, wherein, the keyways are dovetailed.
4. The toolholder guide of claim 2, wherein:
    the material of the strips is plastic.
5. The toolholder guide of claim 4, wherein:
    the material of the strips is selected from among Delrin, Lexon and Zytel.
6. The toolholder guide of claim 1, wherein:
    the material of the strips is metallic.
7. The toolholder guide of claim 1, wherein:
    the material of the strips is plastic.
8. The toolholder guide of claim 7, wherein:
    the material of the strips is selected from among the nylons.
9. The toolholder guide of claim 8, wherein:
    the material of the strips is selected from among Delrin, Lexon and Zytel.
10. The toolholder guide of claim 8 wherein, the keyways are dovetailed.

* * * * *